United States Patent
Ferguson et al.

(10) Patent No.: US 6,463,949 B2
(45) Date of Patent: Oct. 15, 2002

(54) METHOD AND APPARATUS FOR DETERMINING A VALVE STATUS

(75) Inventors: Alan L. Ferguson, Peoria; Matthew C. Full, Morton; Matthew J. Miller, Peoria, all of IL (US); Michael K. Oudyn, Herbeys (FR); Derek A. Sauder, Tremont, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/733,178

(22) Filed: Dec. 8, 2000

(65) Prior Publication Data

US 2002/0069916 A1 Jun. 13, 2002

(51) Int. Cl.⁷ .............................. F16K 37/00; F15B 9/03
(52) U.S. Cl. ..................... 137/2; 137/487.5; 137/551; 73/168; 91/363 A
(58) Field of Search .................... 137/2, 487.5, 551, 137/552, 557; 73/168; 91/363 A; 702/185

(56) References Cited

U.S. PATENT DOCUMENTS

| | | | |
|---|---|---|---|
| 3,828,814 A | * 8/1974 | Neumann et al. | ........... 137/486 |
| 4,079,806 A | 3/1978 | Hoag et al. | |
| 4,489,551 A | 12/1984 | Watanabe et al. | |
| 4,503,674 A | 3/1985 | Backe et al. | |
| 4,550,747 A | * 11/1985 | Woodworth et al. | ..... 137/487.5 |
| 4,558,593 A | 12/1985 | Watanabe et al. | |
| 4,621,551 A | 11/1986 | Silverman | |
| 4,647,004 A | 3/1987 | Bihlmaier | |
| 5,322,003 A | 6/1994 | Winyard et al. | |
| 5,332,366 A | 7/1994 | Anderson | |
| 5,460,196 A | * 10/1995 | Yonnet | ......................... 137/12 |
| 5,563,351 A | 10/1996 | Miller | |
| 5,628,229 A | 5/1997 | Krone et al. | |
| 5,641,523 A | 6/1997 | Shioiri et al. | |
| 5,992,229 A | * 11/1999 | Pyotsia et al. | ............... 700/282 |
| 6,302,130 B1 | * 7/2000 | Ohmi et al. | ................... 137/14 |

\* cited by examiner

*Primary Examiner*—Michael Powell Buiz
*Assistant Examiner*—Ramesh Krishnamurthy
(74) *Attorney, Agent, or Firm*—W. Bryan McPherson; R. Carl Wilbur

(57) ABSTRACT

The present invention provides a method and apparatus for detecting a status of a valve, the valve being connected to a fluid circuit. The method includes the steps of establishing an expected value of a characteristic of the fluid of the fluid circuit, determining an actual value of the fluid characteristic of the fluid circuit, and determining a valve status in response to the actual value, and the expected value.

24 Claims, 3 Drawing Sheets

METHOD AND APPARATUS FOR DETERMINING A VALVE STATUS

Technical Field

This invention relates generally to a fluid circuit, and more particularly, to a method and apparatus for determining the status of a valve associated with the fluid circuit.

BACKGROUND ART

Fluid circuits are used in mobile machines in many different applications, such as to drive hydraulic cylinders for lifting or controlling the blade or bucket of an earth moving machine, or in machines having a hydrostatic drive train that use fluid power to control the motion of the machine. Proper operation of the valves in these fluid circuits is important to achieve the desired operation of the machine. In addition, accurate status monitoring of the valve is important to ensure that if a valve malfunction, or failure occurs, the appropriate action may be taken to ensure further damage to the fluid circuit, or machine itself does not occur. For example, if necessary, the machine may be quickly stopped.

Some systems, such as that disclosed in U.S. Pat. No. 5,322,003 to Winyard, disclose a system that determines a valve failure by comparing an actual valve pressure with an expected fluid pressure. If the valve is operating within the fixed design parameters, then the valve is determined to be operating properly. However, Winyard does not disclose determining an error threshold in response to a circuit characteristic, and using the error threshold when comparing the actual and expected fluid pressures. Therefore, circuit conditions which may effect the operation of the fluid circuit are not accounted for. In addition, changes in the circuit conditions are not accounted for. The result is that the Winyard system may not accurately determine when a failure exists, in part because the system does not account for the conditions of the circuit. Therefore, in one example, false alarms may exists which could inappropriately lead to system shut down or maintenance requests. In addition, the expected valve pressures of the Winyard system are determined offline and downloaded to the system. Therefore, variations in the manufacturing of the fluid circuit hardware may not be accounted for in the comparison of the actual with expected pressure values.

The present invention is directed to overcoming one or more of the problems identified above.

DISCLOSURE OF THE INVENTION

Some systems, such as that disclosed in U.S. Pat. No. 5,322,003 to Winyard, disclose a system that determines a valve failure by comparing an actual valve pressure with an expected fluid pressure. If the valve is operating within the fixed design parameters, then the valve is determined to be operating properly. However, Winyard does not disclose determining an error threshold in response to a circuit characteristic, and using the error threshold when comparing the actual and expected fluid pressures. Therefore, circuit conditions which may effect the operation of the fluid circuit are not accounted for. In addition, changes in the circuit conditions are not accounted for. The result is that the A go Winyard system may not accurately determine when a failure exists, in part because the system does not account for the conditions of the circuit. Therefore, in one example, false alarms may exist which could inappropriately lead to system shut down or maintenance requests. In addition, the expected valve pressures of the Winyard system are determined offline and downloaded to the system. Therefore, variations in the manufacturing of the fluid circuit hardware may not be accounted for in the comparison of the actual with expected pressure values.

In another aspect of the present invention, an apparatus is configured to determine a status of a valve in a fluid circuit is disclosed. The circuit has a pump configured to deliver fluid to the circuit. The apparatus includes a sensor configured to sense a characteristic of the fluid in the fluid circuit and responsively generate a fluid characteristic signal; and a controller configured to receive the fluid characteristic signal, establish an expected value of the fluid characteristic, and determine a valve status in response to the sensed fluid value and the expected value.

BEST MODE FOR CARRYING OUT THE INVENTION

Figure 1:
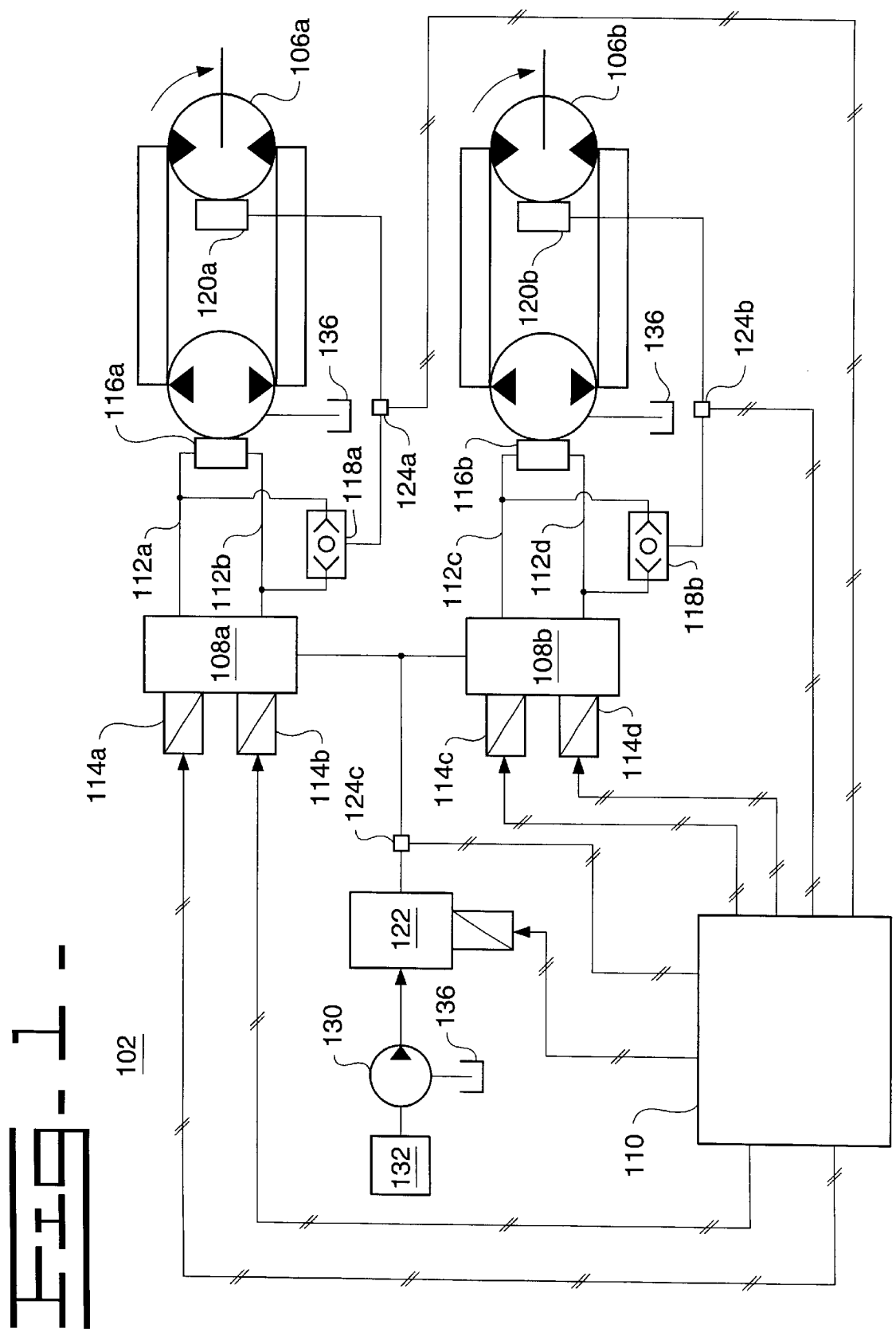
FIG. 1 is a system level block diagram of one embodiment of a fluid circuit.

The present invention provides a method and an apparatus configured to determine a status of a valve located in a fluid circuit. FIG. 1 is an illustration of one embodiment of a fluid circuit 102. The fluid circuit 102 illustrated in FIG. 1 applies to a machine having a hydrostatic drive, such as a track type loader, a track type tractor and the like. However, as will be described, the invention is equally applicable to fluid circuits other than those associated with hydrostatic drives, and the circuit 102 of FIG. 1 is provided for exemplary purposes only. The fluid circuit 102 includes two proportional control valves 108a, 108b which are controlled by the controller 110. The control valves 108a, 108b are fluidly connected to respective controller 116a, 116b of the two pumps 104a, 104b respectively. The proportional control valves 108a, 108b are also fluidly connected to respective motor controllers 120a, 120b of two motors 106a, 106b respectively. The two pumps 104a, 104b are fluidly connected to, and drive the two motors 106a, 106b. The two motors 106a, 106b in turn drive a left and right track (not shown) of the machine respectively. The circuit 102 also includes a pilot pump 130 which delivers fluid to the control valves 108a, 108b through an override valve 122. The pilot pump 130 is driven by an engine 132 which is also controlled by the controller 110. In one embodiment, the fluid circuit 102 has a left track portion 126a, and a right track portion 126b. Each track portion 120a, 120b of the circuit 102 includes a forward and reverse portion.

During the operation of the machine, the controller 110 receives one or more operator inputs (not shown) indicative of the desired direction and desired speed of the machine. The controller 110 then determines the appropriate valve command signals needed to achieve the desired machine motion. The controller 110 delivers the appropriate valve commands to the proportional control valves 108a, 108b. For example, if the operator desires to turn the machine to the right, in the forward direction, then the control valve 108a associated with the left track, is commanded to move to a position to enable fluid to flow via the left forward portion 112a of the fluid circuit 102. In one embodiment, the proportional control valve has two solenoids 114a, 114b, which enable the valve 108a to control the volume of fluid flowing to the left forward portion 112a of the fluid circuit 102, and the left reverse portion 112b of the fluid circuit 102. Actuating the left forward solenoid 114a will enable pressurized fluid to flow through the left forward portion 112a of the control circuit 102 to a pump controller 116a, in proportional response to the magnitude of the command received. The pump controller 116a receives the pressurized fluid and controls the displacement of the pump 104 and the direction of the displacement, in response to the magnitude of the dominant pressure of either the left forward or reverse portion 112a,b of the circuit 102. Reverse flow from the pump 104a is controlled by actuating solenoid 114b. The pump 104a is preferably a variable displacement pump that delivers fluid to the motor 106a through one of two fluid conduits depending on whether the track is desired to move in a forward direction, or a reverse direction. In addition, a resolver 118a establishes which of the fluid pressures (the fluid pressure of the left forward portion 112a of the fluid circuit or the left reverse portion 112b of the fluid circuit) is at a higher pressure, and delivers the higher pressure fluid to the motor controller 120a. The motor controller 120a, receives the fluid from the resolver 118a and controls the displacement of the motor, thus controlling the rate at which the output from the motor 106a turns. In the preferred embodiment, the motor 106a turns in either a forward or reverse direction in response to receipt of the fluid from the pump in either the forward or reverse fluid conduit.

Therefore, when the machine is commanded in the left forward direction, the pump 104a pumps a fluid at a flow rate and pressure responsive to the valve command received by the valve 112b. The fluid flow generated by the pump driving the motor 106a which in turn is used to drive the left track in the desired direction, at the desired speed. The right track portion 126b of the circuit 102 operates in an analogous manner to the left track portion 126a of the circuit 102. Consequently, if equal commands are delivered to proportional valves 108a, 108b, the machine would move forward in a straight line.

The override valve 122 receives pressurized fluid from the pilot pump 130, and when actuated controllably delivers the pressurized fluid through the proportional control valves 108a, 108b to the left and right track portions 126a, 126b of the fluid circuit 102. The controller 110 also controls the position of the override valve 122, which may be either a proportional control valve, or an on/off, or two position, type valve. In one embodiment, the controller 110 commands the override valve 122 to an open position during normal operations of the machine. However, in the event of a system error, the override valve 122 may be commanded to a closed position such that no fluid flows to either of the proportional control valves 108a, 108b. Therefore, no power is generated by either of the pumps 104a,b or motors 106a,b and accordingly the machine quickly comes to a stop.

The fluid circuit 102 also includes one or more sensors 124 configured to sense a characteristic of the fluid in the fluid circuit 102, and responsively deliver a fluid characteristic signal to the controller 110. The type of fluid characteristics sensed include pressure level or volumetric flow rate. In the preferred embodiment, the sensor is a pressure sensor, configured to sense a pressure of the fluid. Alternatively the sensor may be a fluid flow sensor configured to sense the fluid flow of the circuit. The number of sensors used is implementation dependent. In the preferred embodiment the fluid circuit includes three pressure sensors 124a, 124b, 124c to sense the highest pressure of the left track fluid circuit 126a, the highest pressure of the right fluid circuit 126b, and the pressure of the fluid exiting the override control valve 122.

In one embodiment, a temperature sensor (not shown) may be used to sense a temperature of the circuit fluid, and responsively deliver a temperature signal to the controller 110. The temperature sensor may be located in the fluid tank 136 of the fluid circuit 102.

Figure 2:
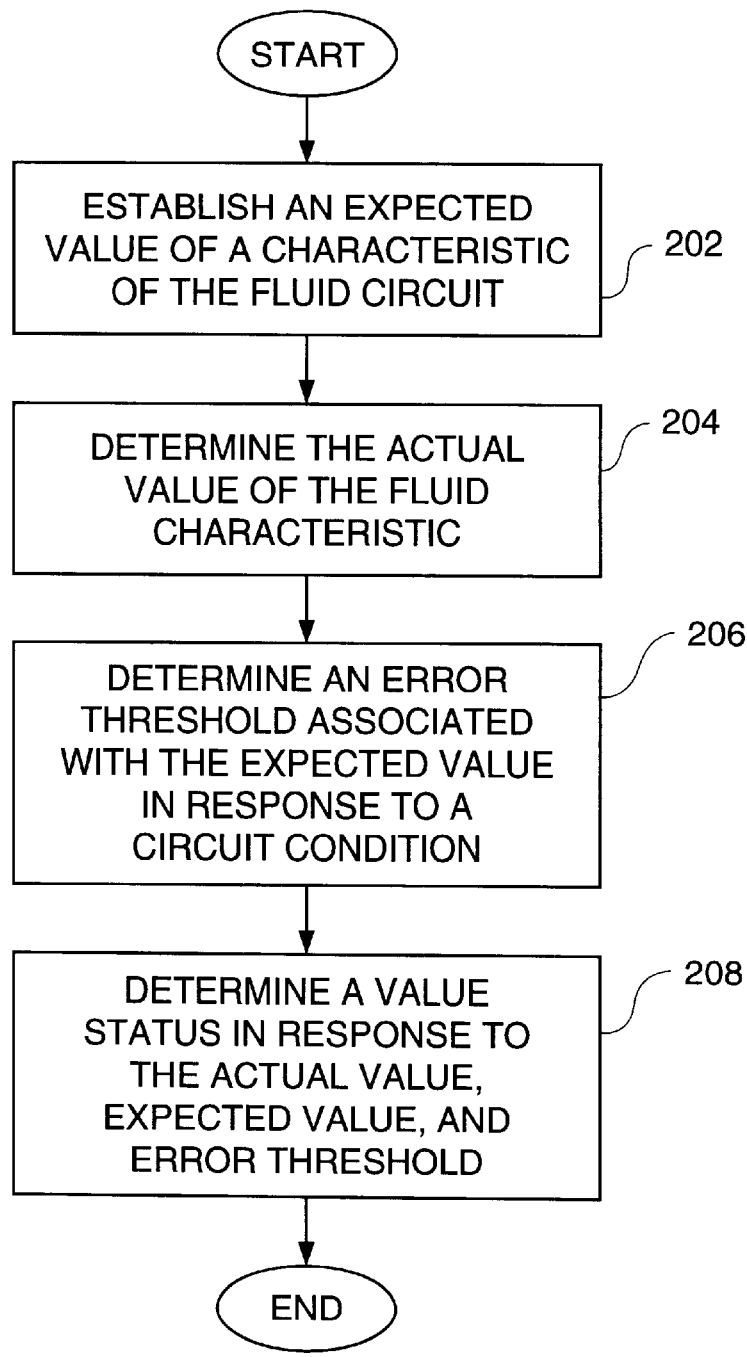
FIG. 2 illustrates one embodiment of a method of determining the status of a valve in a fluid circuit.

FIG. 2 illustrates a flow diagram of one embodiment of the method of the present invention, for determining a status of a valve in the fluid circuit 102. In a first control block 202 an expected value of a characteristic of the fluid of the fluid circuit is established. In the preferred embodiment, the expected value is the expected fluid pressure of the fluid exiting the valve being monitored. Alternatives of the fluid characteristic include the fluid flow rate. For example, with regard to expected fluid pressure, the controller 110 receives one or more operator inputs (not shown), and responsively determines the desired speed and desired direction of the machine. The operator inputs may include a joystick input indicating machine direction and throttle input indicating machine speed. In one embodiment, once the desired speed and the desired direction are determined, or indicators thereof, the controller 110 may determine the valve commands necessary to achieve the desired speed and direction.

In the preferred embodiment, a valve response table has been established which correlates an operator input to a valve command necessary to achieve the desired output fluid characteristic, e.g., fluid pressure, from a designated valve 112a, 112b, for a particular pump speed. In the preferred embodiment, the valve response table includes the fluid characteristic, e.g., fluid pressure, that is expected to result from the valve command at a given pump speed. Under normal operating conditions, the fluid being delivered to the proportional control valves 108a,b is being delivered at a steady pressure, e.g., 2500 kPa (360 p.s.i.). Accordingly, the pressure of the fluid exiting the valves 108a, 108b is a function of the valve position. Therefore, based on the operator input commands and an established valve response table the expected output fluid pressure for a given proportional control valve may be determined. The valve response table may be determined through empirical analysis. In the preferred embodiment, the valve response table is customized for each machine to take into account variations that may exist from one fluid circuit to another. The valve response table may also be referred to as a calibration table. In one embodiment, equations instead of, or in conjunction with a variable response table, may be used to determine the correlation between the operator command and associated valve command and expected fluid characteristic. In addition, other fluid characteristics, such as fluid flow, may be stored in the valve response table, instead of, or in conjunction with fluid pressure.

In a second control block 204, the actual value of the fluid characteristic of the fluid circuit may be determined. In the fluid circuit 102 illustrated in FIG. 1, the fluid of the highest pressure of either the left forward portion 112a or the left reverse portion 112b flows through the resolver 118a. Therefore, the pressure sensor 122a senses the highest pressure of either the left forward portion 112a or left reverse portion 112b of the fluid circuit 102. Alternatively, the pressure of the fluid in the left forward portion 112a of the circuit 102, and the left reverse portion 112b of the circuit 102 may be directly sensed, instead of sensing a single pressure at the output of the resolver 118a. In either case, the valve response table may be configured to include the associated expected fluid pressures at the sensed location based upon the operator inputs.

In a third control block 206 an error threshold, or error range, associated with the expected value, is determined in response to a circuit characteristic. As will be described, a comparison is made between the actual fluid value, e.g., sensed pressure, and the expected fluid value, e.g., expected pressure, to determine the status of the valve. However, to account for acceptable variations in circuit conditions, an error threshold or range is established such that the actual fluid value does not have to exactly equal the expected value, but rather may fall within a range, or threshold of the expected value and still be considered acceptable. In the present invention, the error threshold is established in response to a circuit condition. Circuit conditions that may be accounted for include, the fluid temperature, the input fluid pressure from the override valve 122, the input fluid flow rate from the override valve 122, and/or the pilot pump displacement or volumetric flow from the pilot pump feeding the override valve 122. Therefore, fluctuations may occur in the circuit conditions which may lead to larger, or smaller errors which are not attributable to the proportional valve itself. In one embodiment, the operation of a valve, such as the proportional control valve 108a, 108b, may be necessary for the operation of the machine. If the valve is deemed to be malfunctioning, then the operation of the machine is stopped. However, to avoid misdiagnosing the valve, it is desirable to filter out false failures. The present invention achieves this by determining the error threshold in response to one or more circuit conditions. For example, in one embodiment, when the fluid temperature is below a temperature threshold, there are changes in the circuit dynamics. These changes may include anomalies in the fluid circuit 102 which lead to fluid pressure spikes, or the changes may have a more gradual and predictable effect on the fluid circuit. In either case, a circuit condition may be determined, e.g., fluid temperature, and an error threshold may be determined in response to the fluid temperature. For example, a larger error threshold may be used when the temperature is below a threshold, e.g., twenty degrees Celcius, to account for sporadic anomalies such as a pressure spikes. Alternatively, the flow rate may be monitored as a circuit condition. A slower flow rate may be determined to be indicative of a colder temperature, and therefore, a larger error threshold may be used when the flow rate is less than a threshold, to account for the potential change in circuit response during cold temperatures. Therefore, in one embodiment, the error threshold is determined in response to one or more circuit conditions.

In the preferred embodiment, the error threshold is modified in response to a change in the circuit condition. For example, the fluid temperature may be monitored, and as the temperature increases above the temperature threshold, the error threshold may be modified. In one embodiment, the error threshold, or range, may be decreased when the temperature rises above the temperature threshold since the above referenced pressure spikes are no longer anticipated.

In another embodiment, the circuit condition monitored may be the fluid pressure of the fluid exiting the override valve. As the fluid pressure of the fluid from the override valve 120 drops, the pressure of the fluid being output by the proportional control valve may also drop. Therefore, in one embodiment, a different error threshold may be used when the fluid pressure from the proportional valve is at a maximum value than when the fluid pressure has dropped to 75% of maximum value, for example. Accordingly, when the fluid pressure drops below a fluid pressure threshold, the error threshold may be expanded to account for the fact that the actual fluid pressure from the proportional control valve is also going to drop, but not as a result of the proportional control valve malfunctioning. The pressure of the fluid exiting the override valve 122 may drop for reasons which include: the override valve 122 is malfunctioning, the pump 130 or associated engine is malfunctioning, or the pressure is gradually reducing due to wear and tear of the elements of the circuit, e.g., the engine 132, the pump 130, or the valves 122, 108a, 108b, etc.

In the preferred embodiment, as the fluid pressure from the override valve drops below a pressure threshold, the expected fluid pressure to be outputted by the proportional control valve is modified. In light of this modification, the error range, or threshold is preferrably also modified to account for the change in the fluid pressure. Again, the variable response table may account for the a desired valve position to account for pump displacement, and/or changing input fluid pressure.

Analogous strategies may be used for changes in other circuit conditions, such as changes in fluid flow rate from the proportional control valve, or changes in determined pump displacement.

In a fourth control block 208, a valve status is determined in light of the actual fluid value, expected fluid value, and the determined error threshold. In the preferred embodiment, the actual fluid value is compared with the expected fluid value. If the difference between the two values is greater than the error threshold, then a valve malfunction may determined to exist. For example, if the sensed pressure is not within the error threshold of the expected fluid pressure, then a valve malfunction may be determined to exist. The valve status may include a good, and a failed (or malfunctioned) status. If the valve status is considered to be failed, then, depending on the implementation, the fluid circuit 102 may be shut down. For example, if one of the proportional control valves 108a, 108b fails, the override valve 122 may be activated in a manner disabling any fluid flow through either valve 108a, 108b thereby stopping fluid flow to either of the pumps 104a, 104b, or the motor 106a, 106b, thereby stopping motion of the machine.

Figure 3:
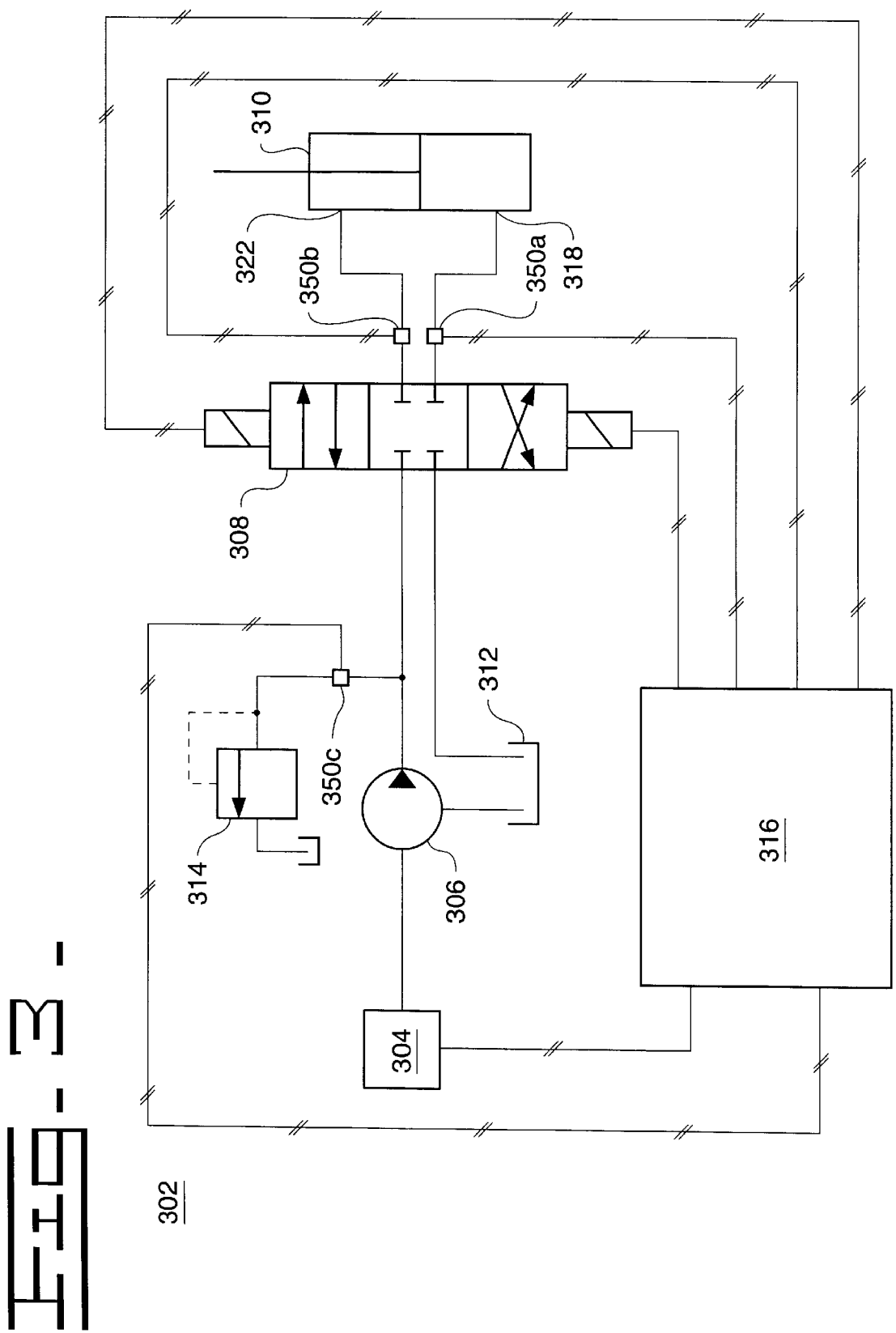
FIG. 3 is an alternative embodiment of the fluid circuit.

While FIG. 1 illustrates the preferred embodiment of the invention, the invention is equally applicable to other fluid circuits having control valves. The fluid circuit 302, illustrated in FIG. 3, includes a pump engine 304 driving a pump 306. The pump 306 may be either a fixed or variable displacement pump. The pump 306 delivers actuating fluid to the circuit 302. In particular the pump 306 delivers fluid to a fluid actuator 310 via a control valve 308. In one embodiment the actuator 310 is a cylinder. Only one fluid actuator 310 and valve 308 are illustrated in FIG. 3, however, multiple cylinders and valves may be connected to the pump 306. The proportional control valve 308 controls fluid flow to the cylinder 110. Other types of valves may be used instead of the proportional control valve. The fluid flows through the valve 308 into the head end 318 of the cylinder 310, exits the rod end 332 of the cylinder 310 and returns to a fluid sump 312, or tank. The tank 312 is also attached to the pump 306. The circuit 302 includes a relief valve 314 connected between the pump 306 and the tank 312.

The circuit 302 includes a controller 316. The controller 316 is electrically connected to the valve 108. The controller 316 receives operator inputs and responsively controls the position of the cylinder 310 by controlling the position of the valve 308. The controller 316 delivers command signals to the valve 308 in order to control the position of the valve 308, thereby controlling the amount of fluid that flows to the cylinder 310. Therefore, the position of the cylinder 310 is controlled by the controller 316. The controller 316 also receives inputs from one or more fluid characteristic sensors. For example, in FIG. 3, three pressure sensors 350a, 350b, 350c sense the pressure at different locations in the fluid circuit and responsively deliver pressure signals to the controller 316. In response to the sensor inputs, a software program executing within the controller 316 may determine the status of the valve 308.

In one embodiment, a valve response table may be developed for the control valve 308. For example, the controller 316 may receive an operator input command regarding the desired motion of the actuator, e.g., to extend or retract the actuator and the speed at which this is desired. The valve response table may be utilized to correlate the operator input command with the appropriate valve command to achieve the necessary valve position for the desired actuator motion. In addition, the table may also have the associated fluid characteristics, e.g., fluid pressure, or fluid flow, that are expected in response to the valve command, or expected resultant valve position. Therefore, in one embodiment, an expected value of a characteristic of the fluid may be determined. For example, the valve response table may be used to determine the expected fluid pressure of the fluid entering/exiting the head end 318 of the cylinder in response to the valve command, or operator input command. The actual value of the fluid characteristic, e.g., sensed fluid pressure, may be determined. An error threshold associated with the expected fluid value may be determined in response to a circuit characteristic. Examples of circuit characteristics include, fluid temperature, system pressure, fluid flow through the relief valve 314, pump displacement, or other analogous characteristics. The error threshold is preferably modified when the circuit characteristic changes. For example, the error threshold may decrease as the fluid temperature rises above 20 degrees C.

The valve status may then be determined in response to the actual fluid value, expected fluid value, and the error threshold. For example, as before, the actual and expected fluid values may be compared with each other. If the difference is greater than the error threshold then a valve malfunction may be determined to exist.

INDUSTRIAL APPLICABILITY

The present invention provides a method and apparatus for detecting a status of a valve. The method includes the steps of establishing an expected value of a characteristic of the fluid of the fluid circuit, determining an actual value of the fluid characteristic of the fluid circuit, determining an error threshold associated with the expected value in response to a circuit characteristic, and determining a valve status in response to the actual value, the expected value, and the error threshold.

If the valve is determined to be malfunctioning, then a controller may notify the operator, whether on board or offboard, with an indication of the valve failure, such as a warning light or message to the display. In addition, the failure may be classified for the operator based on the severity of the failure. The operator may be instructed to either schedule service, or shut down the machine depending on the severity of the failure. In one embodiment, depending on the function of the valve, e.g., providing fluid to a hydrostatic drive, the machine may be shut down as quickly as possible once the malfunction is detected to ensure no further harm comes to the machine. For example, referring to FIG. 1, if the controller 110 determines the sensed fluid characteristic is not within an error threshold of the expected fluid characteristic, the override control valve 122 may be closed thereby preventing fluid to flow to either of the control valves 108a, 108b, and the associated pumps and motors. In addition, if the pilot pump 130 is a variable displacement pump, the pilot pump 130 may be destroked, i.e., the fluid displacement may be reduced to zero, to ensure that no fluid flows to the proportional control valves 108a, 108b, in the event the override valve 122 is also malfunctioning. In addition, the parking brake (not shown) of the machine may be engaged. In this manner, the machine may be brought to a rapid stop when a valve malfunction is determined.

Other aspects, objects, and advantages of the present invention can be obtained from a study of the drawings, the disclosure, and the claims.

What is claimed is:

1. A method for determining a status of a valve in a fluid circuit associated with a mobile machine, the fluid circuit having a pump configured to pump fluid in the circuit, and the valve being configured to receive the fluid, comprising the steps of:

establishing an expected value of at least one characteristic of the fluid of the fluid circuit;

sensing at least one actual value of said at least one fluid characteristic;

determining an error threshold associated with said expected-value in response to a circuit characteristic; and determining a valve status in response to said actual value, said expected value, and said error threshold.

2. A method, as set forth in claim 1, further including the step of modifying the error threshold in response to a change in said circuit characteristic.

3. A method, as set forth in claim 2, further including the step of modifying said expected value in response to said changed circuit characteristic.

4. A method, as set forth in claim 3, wherein said circuit characteristic includes a characteristic of the fluid entering the valve.

5. A method, as set forth in claim 4, wherein said circuit characteristic is a fluid temperature.

6. A method, as set forth in claim 5, further including the step of increasing the error threshold in response to said fluid temperature being below an temperature threshold.

7. A method, as set forth in claim 4, wherein fluid characteristic is a pressure of the fluid entering the valve, further including the step of modifying the error threshold in response to said fluid pressure being below a pressure threshold.

8. A method, as set forth in claim 7, including the step of decreasing said expected value in response to said fluid pressure being below said pressure threshold.

9. A method, as set forth in claim 4, wherein said fluid characteristic is a flow of the fluid entering the valve, further including the step of modifying the error threshold in response to said fluid flow being below a flow threshold.

10. A method, as set forth in claim 9, including the step of decreasing said expected value in response to said fluid flow being below said flow threshold.

11. A method, as set forth in claim 4, wherein said fluid characteristic is one of a fluid pressure and a fluid flow.

12. An apparatus configured to determine a status of a valve in a fluid circuit, the circuit having a pump delivering fluid to the circuit, and a valve configured to receive the fluid, comprising:

a sensor configured to sense a characteristic of the fluid in the fluid circuit and responsively generate a fluid characteristic signal; and a controller configured to receive said fluid characteristic signal, establish an expected value of said fluid characteristic, determine an error threshold associated with said expected value in response to a circuit characteristic, and determine a valve status in response to said fluid characteristic signal, said expected value, and said error threshold.

13. An apparatus, as set forth in claim 12, wherein said controller is further configured to modify the error threshold in response to a change in said circuit characteristic.

14. An apparatus, as set forth in claim 13, wherein said controller is further configured to modify said expected value in response to said changed circuit characteristic.

15. An apparatus, as set forth in claim 14, wherein said circuit characteristic includes a characteristic of the fluid entering the valve.

16. An apparatus, as set forth in claim 15, where the circuit characteristic includes a fluid temperature.

17. An apparatus, as set forth in claim 16 wherein said controller is further configured to decrease the error threshold in response to said fluid temperature being below a temperature threshold.

18. An apparatus, as set forth in claim 15, wherein said fluid characteristic is a pilot pressure, and wherein said controller is further configured to modify the error threshold in response to said pilot pressure being below a pressure threshold.

19. An apparatus, as set forth in claim 18, wherein said controller is further configured to decrease said expected value in response to said pilot fluid pressure being below said pressure theshold.

20. An apparatus, as set forth in claim 15, wherein said fluid characteristic is a pilot flow, wherein said controller is further configured to modify the error threshold in response to said pilot flow being below a flow threshold.

21. A method, as set forth in claim 20, wherein said controller is further configured to decrease said expected value in response to said pilot fluid flow being below said flow threshold.

22. An apparatus, as set forth in claim 15, wherein said fluid characteristic is one of a fluid pressure and a fluid flow.

23. An apparatus for controlling fluid flow through a fluid circuit, said circuit including an electronically controlled valve, said apparatus comprising:

an electronically controlled valve responsive to a valve control signal;

a circuit characteristic sensor sensing a parameter indicative of an operating characteristic of said circuit and producing a circuit characteristic signal;

a valve output sensor for sensing a fluid characteristic at an output of said valve and producing a fluid characteristic signal;

wherein an electronic controller produces the valve control signal to control the output of said valve, receives said fluid characteristic signal, determines an expected output, compares the fluid characteristic signal to said expected output, and determines an operational status of said valve as a function of said fluid characteristic signal being within an error tolerance of said expected output;

wherein said electronic controller modifies said expected output as a function of said circuit characteristic signal.

24. The apparatus according to claim 23, wherein said electronic controller modifies said error tolerance as a function of said circuit characteristic signal.

* * * * *

UNITED STATES PATENT AND TRADEMARK OFFICE
CERTIFICATE OF CORRECTION

PATENT NO. : 6,463,949 B2
DATED : October 15, 2002
INVENTOR(S) : Alan L. Ferguson et al.

It is certified that error appears in the above-identified patent and that said Letters Patent is hereby corrected as shown below:

<u>Column 8,</u>
Line 26, replace "expected-value" with -- expected value --.

Signed and Sealed this

Twenty-eighth Day of January, 2003

JAMES E. ROGAN
*Director of the United States Patent and Trademark Office*